US010577007B2

(12) United States Patent
Gasche et al.

(10) Patent No.: US 10,577,007 B2
(45) Date of Patent: Mar. 3, 2020

(54) TRANSPORT TROLLEY

(71) Applicant: Wanzl Metallwarenfabrik GmbH, Leipheim (DE)

(72) Inventors: Thomas Gasche, Leipheim (DE); Dieter Stöckle, Landensberg (DE); Aleksandar Tatic, Ulm (DE)

(73) Assignee: Wanzl Metallwarenfabrik GmbH, Leipheim (DE)

( * ) Notice: Subject to any disclaimer, the term of this patent is extended or adjusted under 35 U.S.C. 154(b) by 0 days.

(21) Appl. No.: 15/999,170

(22) PCT Filed: Feb. 16, 2017

(86) PCT No.: PCT/EP2017/053495
§ 371 (c)(1),
(2) Date: Oct. 10, 2018

(87) PCT Pub. No.: WO2017/140776
PCT Pub. Date: Aug. 24, 2017

(65) Prior Publication Data
US 2019/0077435 A1 Mar. 14, 2019

(30) Foreign Application Priority Data
Feb. 17, 2016 (DE) .................. 10 2016 102 739

(51) Int. Cl.
*B62B 3/14* (2006.01)
*B62B 5/06* (2006.01)

(52) U.S. Cl.
CPC .............. *B62B 3/1416* (2013.01); *B62B 3/14* (2013.01); *B62B 3/1424* (2013.01); *B62B 5/06* (2013.01); *B62B 5/067* (2013.01); *B62B 3/1468* (2013.01)

(58) Field of Classification Search
CPC ....... B62B 3/1416; B62B 3/14; B62B 3/1424; B62B 3/1468; B62B 5/06; B62B 5/067
(Continued)

(56) References Cited

U.S. PATENT DOCUMENTS 6,076,791 A * 6/2000 Rand .................. B62B 3/1408
248/229.24
8,313,114 B1 * 11/2012 Aron .................. B62B 3/1472
280/33.991
(Continued)

FOREIGN PATENT DOCUMENTS

DE 29700857 U1 3/1997
DE 19811774 A1 9/1999
(Continued)

OTHER PUBLICATIONS

ISA European Patent Office, International Search Report Issued in Application No. PCT/EP2017/053495, dated May 10, 2017, WIPO, 4 pages.

*Primary Examiner* — John D Walters
(74) *Attorney, Agent, or Firm* — McCoy Russell LLP

(57) ABSTRACT

The invention relates to a push handle unit having at least one transverse strut and having two end pieces which in the assembled state are arranged at the ends of the transverse strut and have a device for fastening to a manually movable transport trolley, wherein the push handle unit has a free-standing, projecting gripping unit on each of the two end pieces. The gripping unit consists in each case at least of a gripping unit receptacle and of a gripping unit insert, and a gripping unit is formed on each end piece. The invention further relates to a manually movable transport trolley having such a push handle unit.

19 Claims, 9 Drawing Sheets

(58) Field of Classification Search
USPC .................................................. 280/33.992
See application file for complete search history.

(56) References Cited

U.S. PATENT DOCUMENTS

| 9,174,659 | B2* | 11/2015 | Stauff | ................... | B62B 3/1404 |
| 2008/0106050 | A1* | 5/2008 | Jurgen | .................. | G07F 7/0663 |
| | | | | | 280/33.994 |
| 2013/0305486 | A1* | 11/2013 | Sonnendorfer | ....... | B62B 3/1416 |
| | | | | | 16/111.1 |

FOREIGN PATENT DOCUMENTS

| EP | 0985200 B1 | 1/2002 |
| WO | 9630247 A1 | 10/1996 |
| WO | 2012042033 A1 | 4/2012 |

\* cited by examiner

TRANSPORT TROLLEY

CROSS-REFERENCE TO RELATED APPLICATIONS

The present application is a U.S. National Phase of International Patent Application Serial No. PCT/EP2017/053495 entitled "TRANSPORT TROLLEY," filed on Feb. 17, 2017. International Patent Application Serial No. PCT/EP2017/053495 claims priority to German Application No. 10 2016 102 739.1, filed on Feb. 17, 2016. The entire contents of each of the above-cited applications are hereby incorporated by reference in their entirety for all purposes.

TECHNICAL FIELD

The present invention relates to a push handle unit for fastening to a manually movable transport trolley, and to a transport trolley of this type.

BACKGROUND AND SUMMARY

Transport trolleys, such as, for example, shopping trolleys or transport trolleys in DIY stores, have push handle units, by means of which the transport trolley can be pushed by the user. In particular in the retail trade sector, transport trolleys of this type are thus provided with a transversely running or horizontally running handle bar, by means of which the transport trolley can be pushed.

Transport trolleys for heavy and bulky goods, as can be found, for example, in a DIY store or superstore, are frequently provided with projecting handles. These make it possible to adopt a natural hand position when moving the heavily loaded transport trolley.

WO 2012/042033 A1 has already disclosed a push handle for a transport trolley, which, in addition to a transversely or horizontally running transverse bar, also has projecting handle parts at both ends of the push handle, wherein said handle parts are mounted rotatably about a fastening axis and can also be fixed in a position.

EP 0 985 200 B1 has already disclosed a handle with a central piece and two end pieces which are fastenable at the ends of the central piece, wherein the end pieces have a device for fastening to a transport trolley, such as a shopping trolley.

It would be desirable to develop a push handle unit for transport trolleys to the effect that the user can vary his/her hand position and both a vertical and a horizontal handle option is provided.

It is the object of the present invention to develop a push handle unit and a transport trolley of the type mentioned at the beginning in an advantageous manner, in particular to the effect that in particular the vertical handle option of a push handle unit can be improved and better adapted.

This object is achieved according to the invention by a push handle unit comprising at least one transverse strut and two end pieces which, in the mounted state, are arranged at the ends of the transverse strut, wherein the end pieces have a device for fastening to a manually movable transport trolley, wherein the push handle unit has a free-standing, projecting gripping unit on each of the two end pieces, wherein the gripping unit consists in each case of at least one gripping unit receptacle and a gripping unit insert, and wherein a gripping unit receptacle is in each case molded onto an end piece.

The transport trolley can be, for example, a shopping trolley or a transport trolley for DIY stores.

The invention is based on the basic concept that the gripping unit which is free-standing and projects in the mounted state and provides a vertical handle option for the user of the transport trolley is constructed more simply and can be adapted to meet requirements and also corresponding to ergonomic demand. This is achieved by the gripping unit being designed at least in two parts such that, for example, the gripping unit insert can be adapted to meet requirements. Furthermore, the gripping unit insert can easily be exchanged and replaced, for example in the event of damage. This can also take place without the push handle unit or the end pieces having to be completely removed.

The end piece, in particular the gripping unit receptacle, but also the gripping unit insert, can be produced by injection molding. It is conceivable to use correspondingly injection-moldable plastics which are in particular of impact-resistant design. It is conceivable here to use in particular fiber-reinforced polypropylene (PP) or polypropylene (PP) which is not fiber-reinforced, or fiber-reinforced polyamide (PA) or polyamide which is not fiber-reinforced.

Different shapes can be selected for the gripping unit. For example, round or rounded gripping units are conceivable which provide a handle option adapted to the hands of the user of a push handle unit. Troughs for fingers, depositing surfaces, hollows for the thumb and corresponding bulges which are adapted to the hand shape of the user are also conceivable. It is conceivable in particular for a separate supporting surface for the palm of a hand to be provided with a bulge which can then correspondingly rest directly on the inside of the palm. Overall, an ergonomic adaptation is intended to take place, with a configuration being able to be selected in such a manner that it is suitable both for small and for large hands and, for this purpose, height and cross section are correspondingly adapted. By means of an improved support of the hand and a corresponding ergonomic configuration, it is also possible to be able to more simply introduce forces into the gripping unit. By means of the improved supporting possibility of the hand on the gripping unit, it is made easier for the user to be able to move even a heavy shopping trolley or transport trolley. Furthermore, it can be provided that the gripping unit insert is insertable into the gripping unit receptacle. This facilitates the mounting of the gripping unit insert in the gripping unit receptacle. It is conceivable in particular for gripping unit insert and gripping unit receptacle to be adapted to each other.

Furthermore, it can be provided that the gripping unit insert is latchable in the gripping unit receptacle. Simple fastening of the gripping unit insert in the gripping unit receptacle is possible by means of latching. In particular, it is also conceivable for the latching to be able to be released, for example, without a tool. It is thereby possible to be able to insert, and correspondingly exchange, gripping unit inserts of differing shaping in the gripping unit receptacle.

The gripping unit insert can have an attachment edge at least in sections. The attachment edge in turn can be adapted in particular to the border of the gripping unit receptacle. By this means, an unambiguous installation possibility is provided for the gripping unit insert, which permits the installation and in particular also correct installation.

In addition, it is conceivable that an object holder is molded, in particular molded integrally, onto the gripping unit insert. As a result, the gripping unit insert can be formed in one piece with the object holder, i.e. as one part or component. Owing to the integral molding of the object holder onto the gripping unit insert, the entire structural stability of the latter can firstly be increased. The integral molding of the object holder onto the gripping unit insert can also be configured as a single-part molding thereon.

In addition, it is conceivable for the object holder to be designed as a holder for in each case at least one drinks cup and/or a hand scanner and/or a cell phone and/or a tablet or tablet PC and/or a magnifying glass and/or a shopping list. This design of the object holder makes it possible for the users of the transport trolley that the use connected to the transport trolley, for example shopping in specialized retail shops, is noticeably simplified or configured to be more pleasant. For example, by means of the provision of a magnifying glass, a customer in a specialized retail shop can more simply identify certain information, in particular in small print, about a product.

Furthermore, it can be provided that the object holder is designed as a hook and/or an encircling grip and/or a handle cap. This configuration of the object holder likewise provides simplification for the user of the transport trolley when handling the transport trolley and carrying out the activities in conjunction therewith. The configuration as a hook, for example, provides a traveler at an airport with additional options for storing their items of luggage.

Furthermore, it is conceivable that the gripping unit on the one end piece is formed integrally, and that the gripping unit on the other end piece consists of the gripping unit receptacle and the gripping unit insert, onto which the object holder is molded, in particular is molded integrally. To provide the object holder only on one of the two gripping units constitutes a good compromise of that conflict of objectives of, firstly, ensuring better functionality for the user of the transport trolley (e.g. by means of a cup holder or a magnifying glass), but, secondly, not overtaxing the user by means of the ever further increasing functionality density of the transport trolley and not excessively increasing the additionally arising additional costs. In addition, by means of the integral configuration at least of a gripping unit, the structural stability or rigidity of the push handle unit can be increased. It is likewise conceivable for the gripping unit to be molded onto the one end piece as a single part. In other words, the integral molding of the object holder onto the gripping unit insert can also be configured as a single-piece molding thereon. The transverse strut can have a central piece and two handle portions which are separated from each other by the central piece. The central piece can take on certain functions and, by means of the provision of two handle portions, simple handling of the push handle unit can be made possible.

In particular, it can be provided that the central piece has a coin deposit system and/or a display field. A design of this type is known, for example, from EP 0 985 200 B1.

By means of this configuration it is furthermore also possible that the gripping unit inserts can also be fitted only after transport, for example of the preassembled transport trolleys, and for the push handle unit to be able to be fitted without the gripping unit inserts. Moreover, further possibilities arise for facilitating or providing material, color, haptic properties, ergonomic adaptations, possibilities for avoiding static, and for cleaning and exchange.

Furthermore, it can be provided that each handle portion is formed by a projection of the transverse strut and by a projection of an end piece. The effect achieved by this is that the end pieces can be designed to be overall more stable since the central piece does not have to form the handle portion in its entirety and is attached with its free end directly to the end piece. On the contrary, the effect achieved by this is that the end piece with its projection prevents a stress concentration from occurring directly on the end piece.

In addition, it can be provided that the gripping unit receptacle and the gripping unit insert at least partially engage in each other in a form-fitting manner in the mounted state. This facilitates the transmission of forces by pushing and pulling on the gripping unit by the user.

The end piece can be formed from plastic. For example, it is conceivable here to use polypropylene (reinforced or unreinforced) or a fiber-reinforced plastic or fiber-reinforced polyamide (PA) or polyamide which is not fiber-reinforced. In principle, any type of plastic, in particular impact-resistant plastic, is suitable. By means of the formation of the end piece from plastic, it is possible to achieve cost-effective manufacturing.

The gripping unit receptacle can be of substantially cup-like design. This facilitates an insertion of the gripping unit insert into the gripping unit receptacle.

The gripping unit receptacle and the gripping unit insert can be at least partially formed from different materials. By this means, it is possible, for example, to permit different colors in the gripping unit receptacle or end piece on the one side and gripping unit insert on the other side. By this means, it is also possible to achieve antistatic measures; for example, the gripping unit insert can be formed from antistatic materials, or an insulating layer can be provided between gripping unit receptacle and gripping unit insert. Furthermore, it is also possible for the gripping unit insert to be partially provided with rubber inserts or silicone inserts for improving the grip properties.

In addition, it is conceivable that the gripping unit is in each case inclined in the mounted state in the direction of the transverse strut. It thereby becomes possible that, during the pushing of the transport trolley, the hands of the pushing person are not outside the silhouette of the transport trolley, as a result of which the risk of injury to the pushing person can be reduced.

The end piece can furthermore have an extension which is insertable into the transverse strut. This permits a simple and secure connection of end piece and transverse strut. It is conceivable in particular that the extension which is insertable into the transverse strut engages in the transverse strut in a form-fitting manner.

The extension can preferably form an anti-rotation means. The stability of the push handle unit is thereby increased and at the same time the installation is also facilitated.

Furthermore, it can be provided that a gripping unit in the mounted state encloses an angle within the range of between approx. 55° to approx. 85°, in particular approx. 60° to approx. 75°, with the transverse strut. This angular range is particularly favorable as an ergonomic configuration for an ideal engagement point for the user at the moment at which the transport trolley is intended to be pushed by means of the gripping unit. An angular range in particular of between approx. 60° to approx. 75° makes it possible to guide the user's hand on the gripping unit in such a manner that the hand is located within the silhouette of the transport trolley and therefore does not protrude and is thereby protected against collisions.

Furthermore, the present invention relates to a manually movable transport trolley with a push handle unit as described above. The transport trolley can be in particular a shopping trolley or a transport trolley for DIY stores.

BRIEF DESCRIPTION OF THE FIGURES

Further details and advantages of the invention will now be explained in more detail with reference to an exemplary embodiment which is illustrated in the drawing.

In the drawing.

DETAILED DESCRIPTION OF FIGURES

Figure 1:
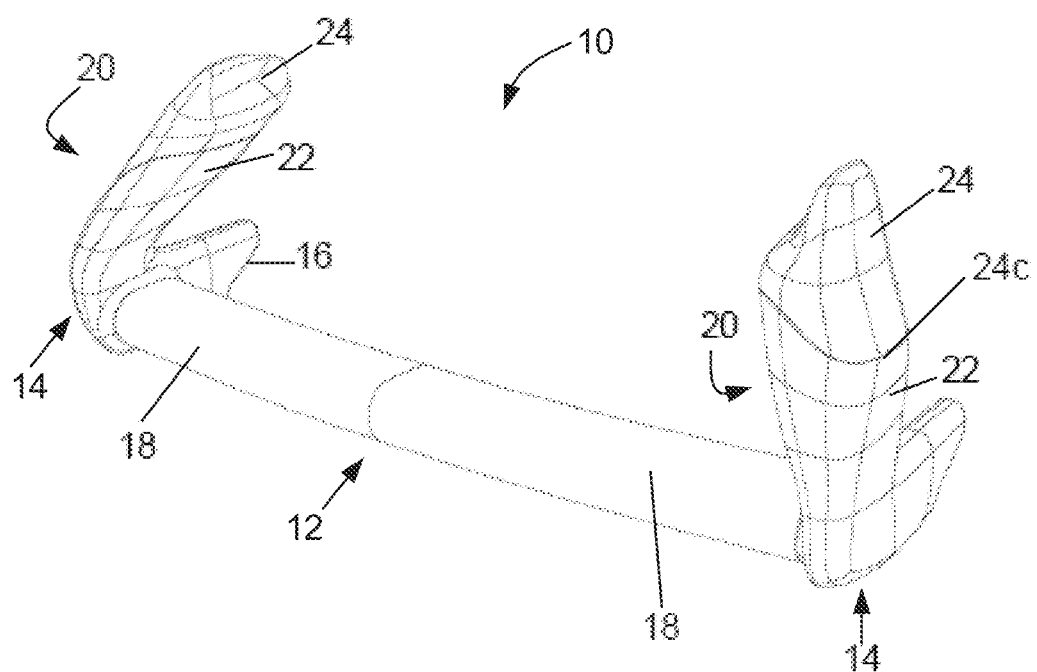
FIG. 1 shows a perspective view of an exemplary embodiment of a push handle unit according to the invention.

FIG. 1 shows an exemplary embodiment of a push handle unit 10 according to the invention in a perspective illustration.

The push handle unit 10 has a transverse strut 12 which is designed here as a transverse bar.

Figure 4:
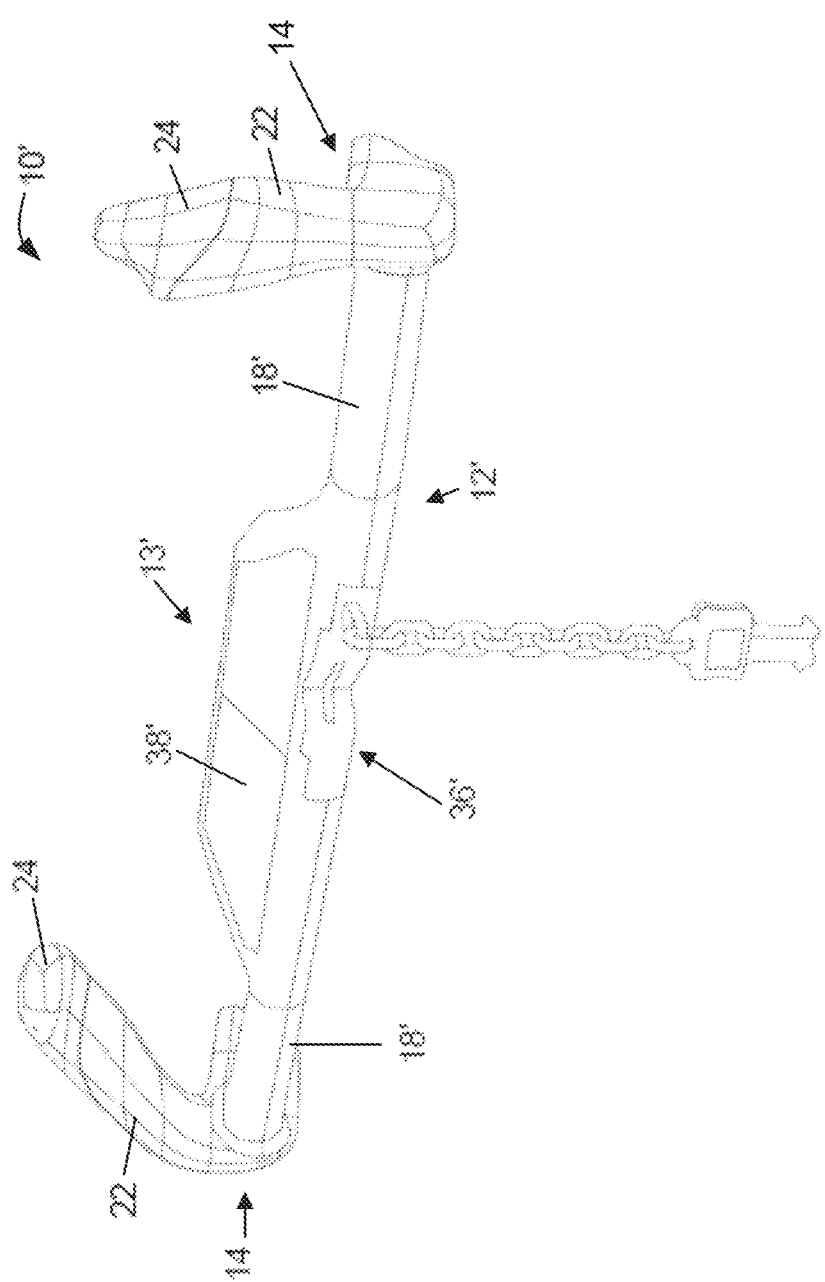
FIG. 4 shows a perspective view of a further exemplary embodiment of a push handle unit according to the invention.

However, the transverse strut 12 can also have a central piece 13' and two handle portions 18' which are separated from each other by the central piece 13' (see FIG. 4).

However, the transverse strut 12 can also have a coin deposit system, as is disclosed, for example, in EP 0 985 200 B1.

In the mounted state, as shown in FIG. 1, the push handle unit 10 furthermore has a respective end piece 14 at both ends of the transverse strut 12, said end pieces being of identical design in a mirror-inverted manner.

The end pieces 14 have a device 16 for fastening to a manually movable transport trolley (not illustrated specifically).

A transport trolley of this type can be a shopping trolley or a transport trolley for DIY stores.

Two handle portions 18 are in each case provided in the region of the ends of the transverse strut 12, said handle portions representing the regular handle position of a person pushing the trolley in the normal pushing mode of the trolley.

As is apparent in FIG. 4, two handle portions 18' which are separated by a portion of the central piece 13' are provided.

At the two end pieces 14, the push handle unit 10 in each case has free-standing, projecting gripping units 20. Each gripping unit 20 is formed here at least from a gripping unit receptacle 22 and a gripping unit insert 24.

The gripping unit receptacles 22 are each molded here onto the associated end piece 14.

In the exemplary embodiment shown, the end piece 14 and the gripping unit receptacle 22 are formed integrally here.

Figure 2:
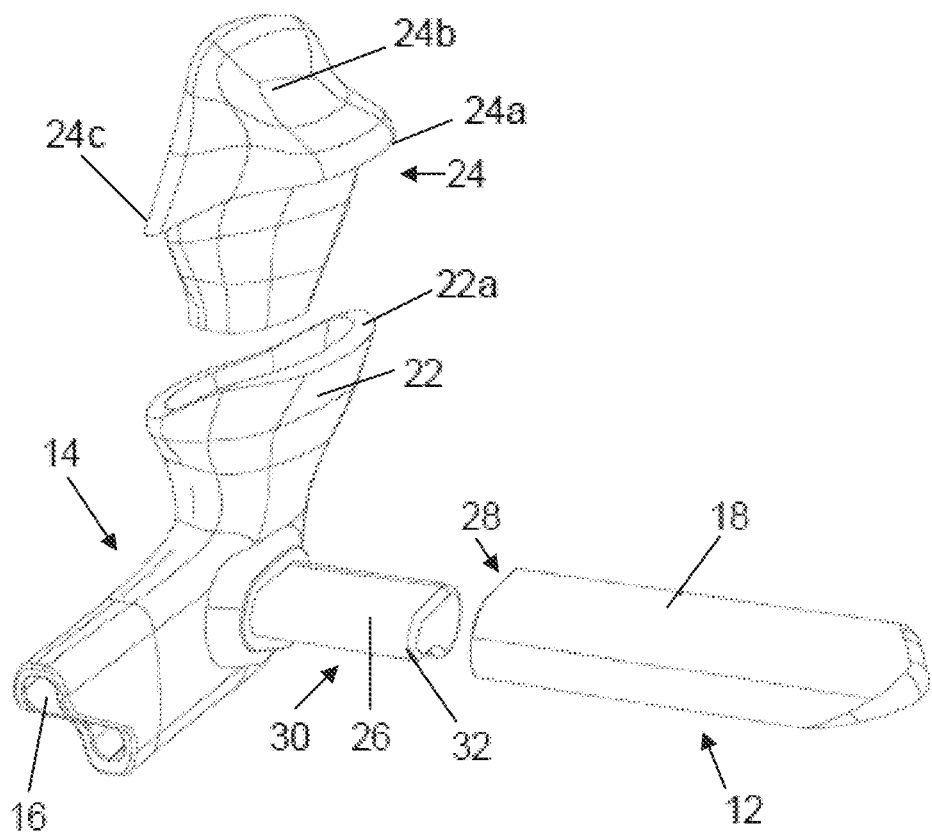
FIG. 2 shows a perspective detailed illustration of a push handle unit according to the invention.

Further details are apparent from FIG. 2.

The gripping unit receptacle 22 is of substantially cup-like design here.

The gripping unit insert 24 is inserted here into the gripping unit receptacle 22 of cup-like design, or is latched into said gripping unit receptacle. In the mounted state, the gripping unit receptacle 22 and the gripping unit insert 24 at least partially engage in a form-fitting manner in each other.

The device for fastening to the manually movable transport trolley 16 is designed in such a manner that it can be placed onto a corresponding extension of a transport trolley. Either merely a form-fitting fastening or a form-fitting fastening with additional bolt fastening, riveting or screwing can be provided there. It is conceivable in principle that the fastening device 16 is placed onto part of a basket or a carrier of the chassis of the transport trolley.

As is furthermore apparent from FIG. 1 and FIG. 2, each handle portion 18 is formed by the transverse strut 12 and by a projection of the end piece 14.

The end pieces 14 are formed here from plastic, here polypropylene (PP). The gripping unit receptacle 22 and the gripping unit insert 24 can be constructed from identical materials. However, this is not absolutely necessary; it is also conceivable for the gripping unit receptacle 22 and the gripping unit insert 24 to be at least partially formed from different materials, as shown here. It is thus provided here that the gripping unit receptacle 22 and the end piece 14 are formed from plastic while the gripping unit insert 24 is partially formed from a rubber material in order to permit better gripping properties.

The gripping unit insert 24 has an encircling attachment edge 24a. The attachment edge 24a in turn is adapted to the edge 22a of the gripping unit receptacle. An unambiguous installation option for the gripping unit insert is thereby provided since there is only one attachment option for the gripping unit insert 24 and the associated gripping unit receptacle 22 (right and left gripping unit of mirror-inverted design), which permits the installation and in particular also correct installation.

Furthermore, the gripping unit insert 24 has a trough 24b for the resting of the thumb.

The shaping of the gripping unit 20 overall is such that the latter provide a handle option which are adapted to the hands of the user of a push handle unit. Troughs for fingers, depositing surfaces, hollows for the thumb and corresponding bulges which are adapted to the hand shape of the user are also conceivable. It is thus in particular conceivable that a separate supporting surface 24c for the palm of the hand is provided with a bulge which can then correspondingly lie directly against the palm.

Overall, the gripping unit 20 is ergonomically adapted, wherein the configuration is selected in such a manner that it is suitable both for small and for large hands and, for this purpose, height and cross section are correspondingly adapted. By means of an improved support of the hand and a corresponding ergonomic configuration, it also becomes possible to be able to introduce forces into the gripping unit 20 more simply. By means of the improved supporting possibility of the hand on the gripping unit 20, it is made easier for the user to be able to move even a heavy shopping trolley or transport trolley.

As shown in FIG. 2, the gripping unit insert 24 is inserted into the gripping unit receptacle 22. The mounting of the gripping unit insert 24 in the gripping unit receptacle 22 is thereby facilitated. Gripping unit insert 24 and gripping unit receptacle 22 are adapted to each other.

The gripping unit 20 is inclined in the direction of the transverse strut 12 in the mounted state, as is also apparent in FIG. 1.

In the mounted state, the two gripping units 20 enclose an angle of approx. 60° to approx. 75° with the transverse strut 12.

The end piece 14 furthermore has an extension 26 which is insertable into a recess 28 which is not shown specifically but is designed for a form-fitting insert.

The extension 26 furthermore has an anti-rotation means 30, wherein the anti-rotation means 30 is formed by the shaping of the extension 26 with a lug 32.

Figure 3:
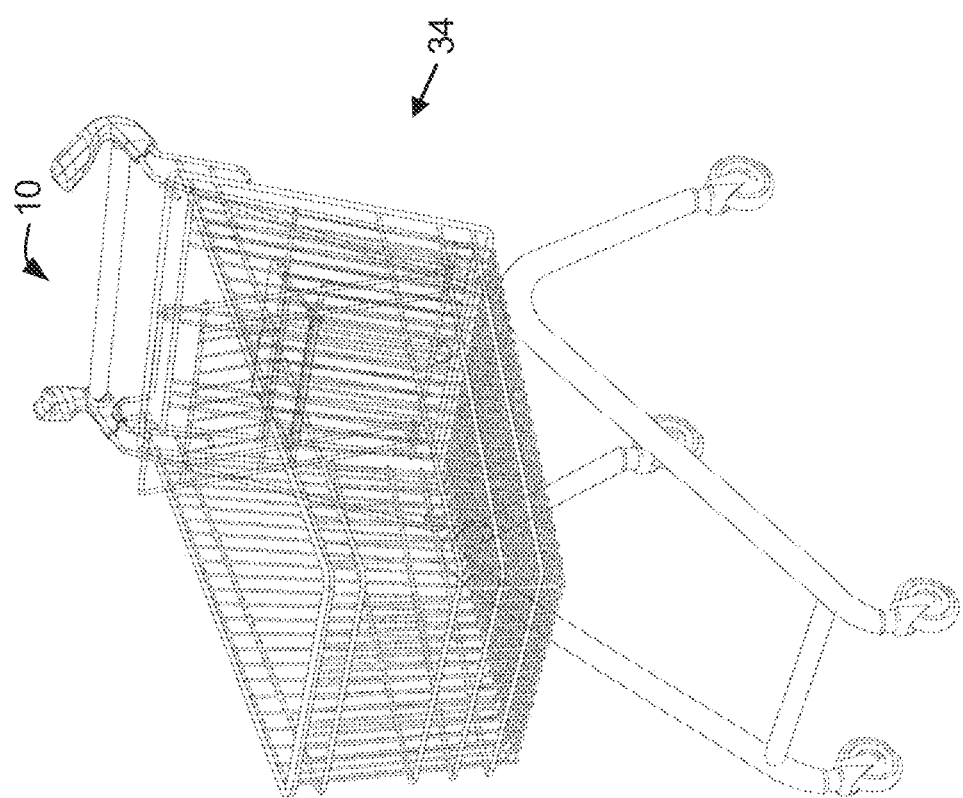
FIG. 3 shows a perspective illustration of a shopping trolley with the push handle unit according to FIG. 1.

FIG. 3 shows the push handle unit 10 in the mounted state on a shopping trolley 34 in a perspective illustration.

The function of the push handle unit 10 can be described as follows:

By means of the handle portions 18, pushing of the transport trolley (not illustrated specifically) is permitted to the effect that the latter can be engaged around as customary with hands placed thereon horizontally and pushed.

By means of the gripping units 20, easier pushing and pulling of the transport trolley is permitted in particular in the event of heavy loading of the transport trolley.

Owing to the fact that the gripping units 20 are of two-part design, namely by means of the gripping unit receptacle 22 and the gripping unit insert 24, it is made possible to be able to more easily replace parts of the gripping units 20 in the event of damage.

Furthermore, it is possible to permit a better ergonomic shaping of the gripping units 20.

In addition, it is possible to mount the gripping unit inserts 24 only after the transport, as a result of which the transport can be facilitated.

In the event of damage to the gripping unit inserts 24, the latter can also be unproblematically exchanged and replaced without having to completely disassemble the entire push handle unit 10.

The gripping unit receptacle 22 and the gripping unit insert 24 or the end piece 14 can be produced by injection molding. Possible materials are, for example, impact-resistant, injection-moldable plastics, such as polypropylene (PP). The injection-moldable plastics can be fiber-reinforced or else not fiber-reinforced.

FIG. 4 shows, in a perspective view, a further exemplary embodiment of a pushing unit 10' which can be alternatively mounted on the shopping trolley 34 shown in FIG. 3.

The transverse strut 12' here has a central piece 13' which is designed as a coin deposit system 36'.

The coin deposit system 36' furthermore has a display field 38' in which an advertisement can be clipped.

The end pieces 14 with the gripping unit receptacle 22 and the gripping unit insert 24 are formed identically as in the exemplary embodiment shown in FIGS. 1 to 3.

Figure 5:
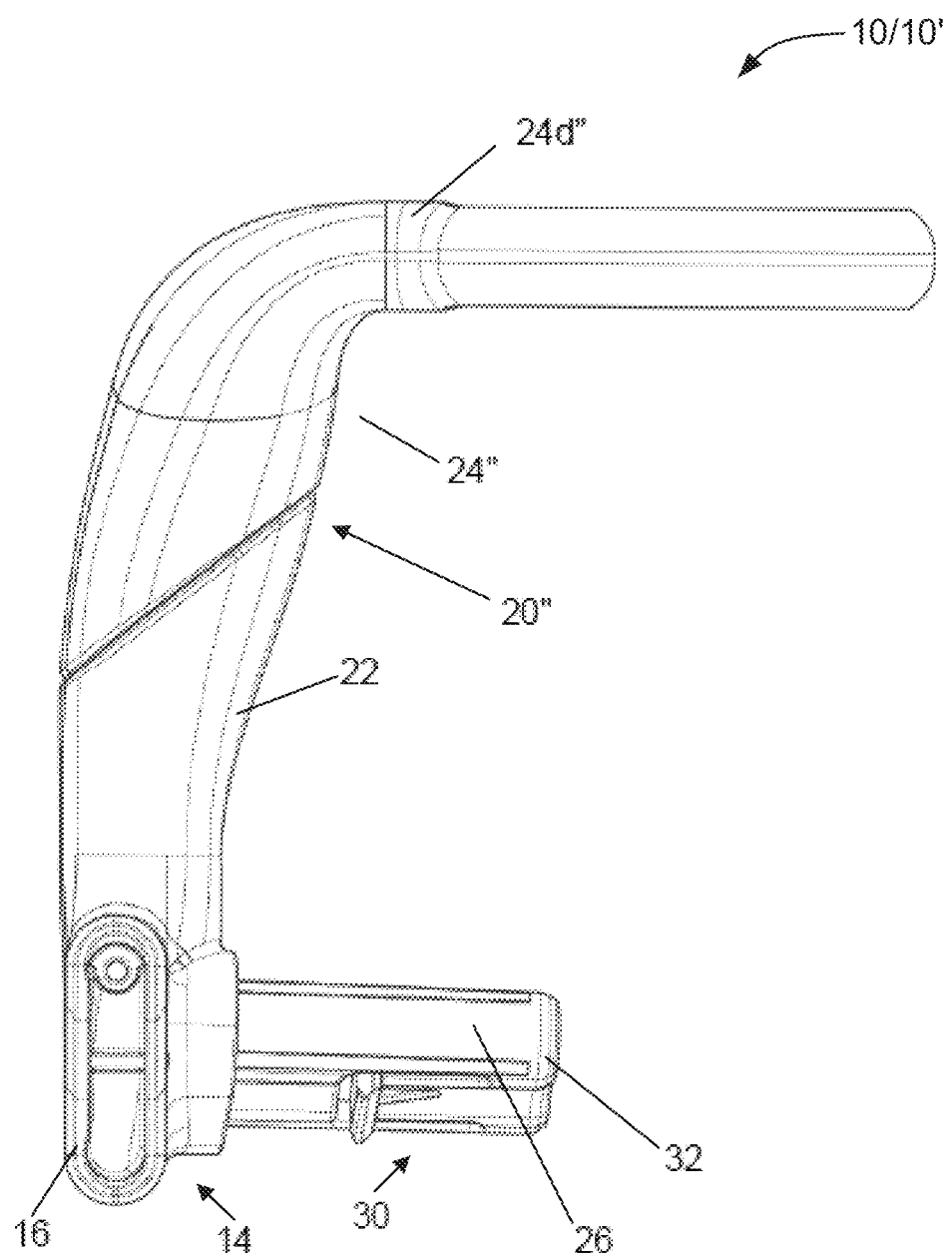
FIG. 5 shows a perspective front view of an exemplary embodiment of a gripping unit according to the invention.

FIG. 5 shows a perspective front view of an exemplary embodiment of a gripping unit 20" according to the invention.

The exemplary embodiment of the gripping unit 20" that is shown in FIG. 5 has substantially the same structural and functional features as the two exemplary embodiments of the gripping unit 20 that are shown in FIGS. 1 to 4.

Only the following structural features will be pointed out:

The gripping unit 20" is formed integrally on the one end piece 14 (not shown in FIG. 5)

On the other end piece 14 according to FIG. 5, the gripping unit 20" consists of the gripping unit receptacle 22 and the gripping unit insert 24".

An object holder 24d" is formed integrally on the gripping unit insert 24", and therefore the gripping unit insert 24" is formed in one piece with the object holder 24d", i.e. as one component.

The object holder 24d" consists of a circular-ring-shaped structural element and an arcuate structural element which connects the gripping unit insert 24" integrally to the outer surface of the circular-ring-shaped structural element.

A drinks cup or an optical lens element can be arranged within the circular structural element.

According to FIG. 5, the object holder 24" is designed as a holder for a drinks cup or a magnifying glass.

Alternatively, the object holder 24" according to FIG. 5 can also be designed as a holder for a hand scanner or a cell phone or a tablet or a shopping list.

Furthermore, the object holder 24d" can also be designed as a hook or an encircling handle or a handle cap.

The gripping unit 20" can furthermore be both part of the exemplary embodiment of the push handle unit 10 according to FIGS. 1 to 3 and of the exemplary embodiment of the push handle unit 10' according to FIG. 4.

The gripping unit 20" is molded here onto the two end pieces 14 which, in the mounted state, are in each case arranged at the ends of the transverse strut 12, 12' and adjoin the transverse strut 12, 12' there.

The end pieces 14 are fastened here by means of the extension 26 within the respective recess 28 (see FIG. 2) of the transverse strut 12, 12' and secured by means of the anti-rotation means 30 or the lug 32 against rotation in relation to the transverse strut 12, 12'.

In addition, the end piece 14 is fastened to the transport trolley 34 by means of the device 16.

For this purpose, the device 16 in each case has a pocket which interacts in a form-fitting manner with a respective extension of a transport trolley 34 or is in each case pushable into the pocket and can thus be connected to said extension.

Figure 6:
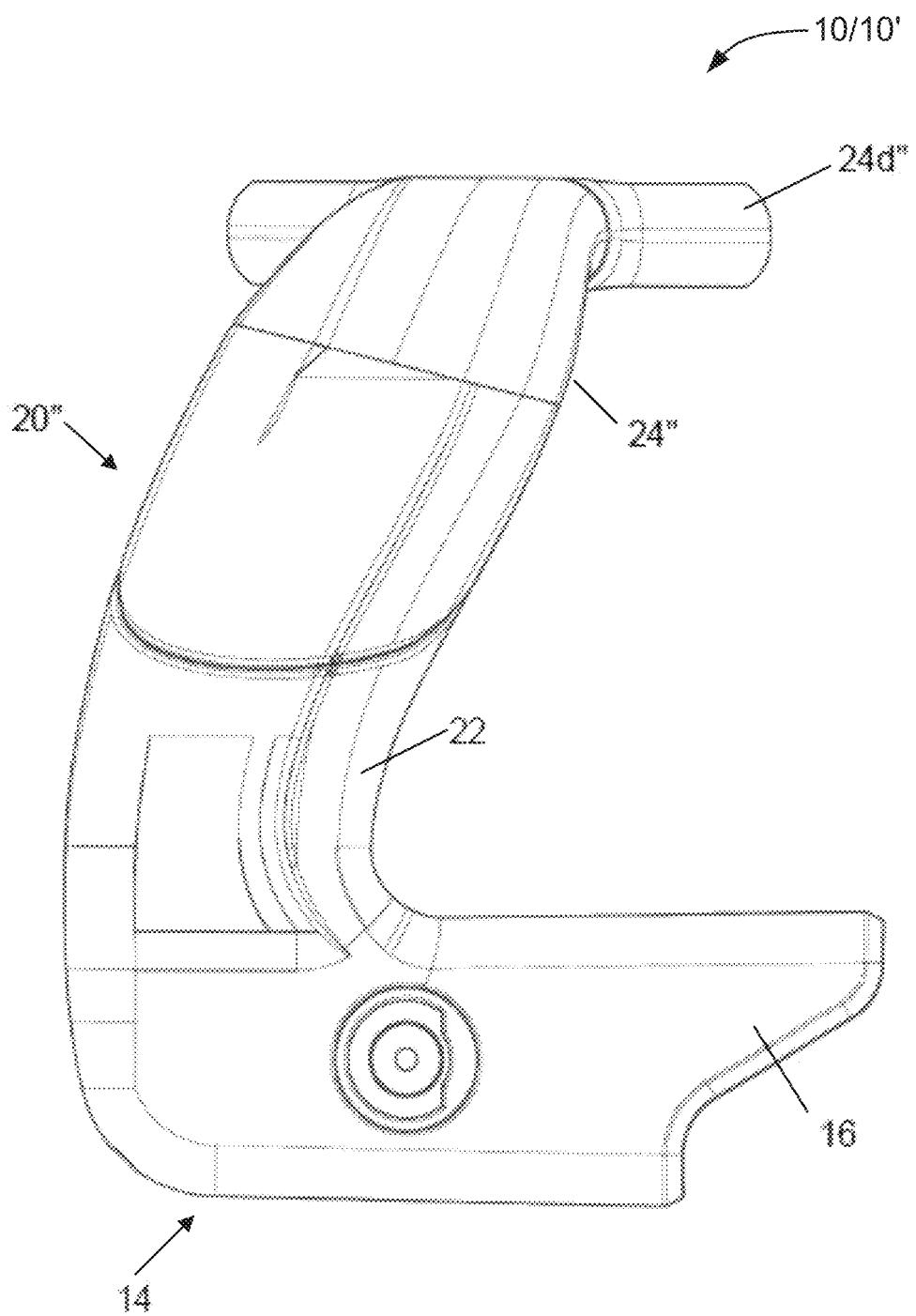
FIG. 6 shows a perspective side view of the exemplary embodiment of the gripping unit according to FIG. 5.

FIG. 6 shows a perspective side view of the exemplary embodiment of the gripping unit 20" according to FIG. 5.

A bolt or a pin with axial fixing, by means of which the respective device 16 and the respective extension of the transport trolley 34 are fixable, is illustrated therein.

Figure 7:
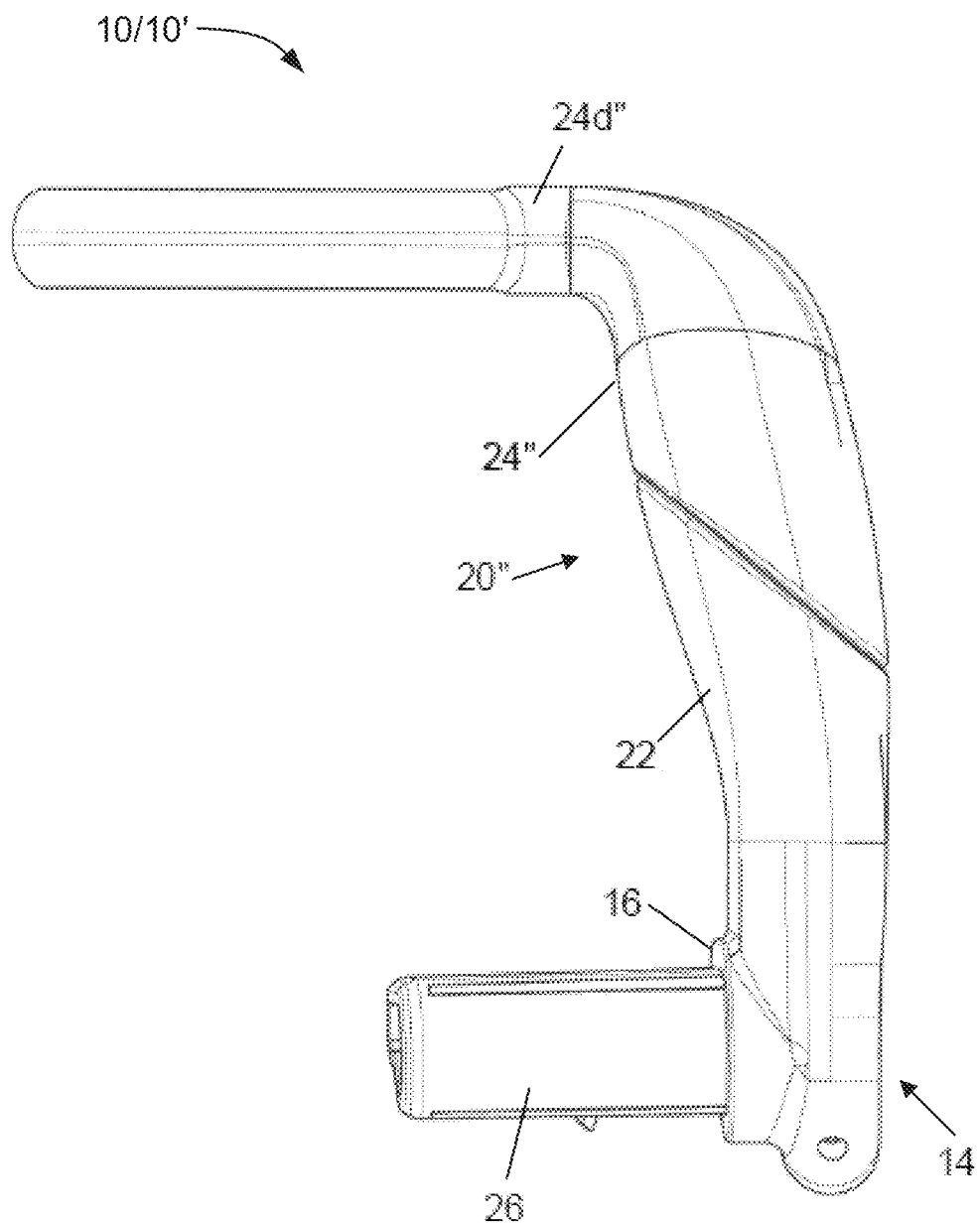
FIG. 7 shows a perspective rear view of the exemplary embodiment of the gripping unit according to FIG. 5.

FIG. 7 shows a perspective rear view of the exemplary embodiment of the gripping unit 20" according to FIG. 5.

FIG. 7 shows an annular extension surface of the end piece 14, which extension surface is adjoined by the respective end piece 14 in the mounted state at the ends of the transverse strut 12, 12'.

Figure 8:
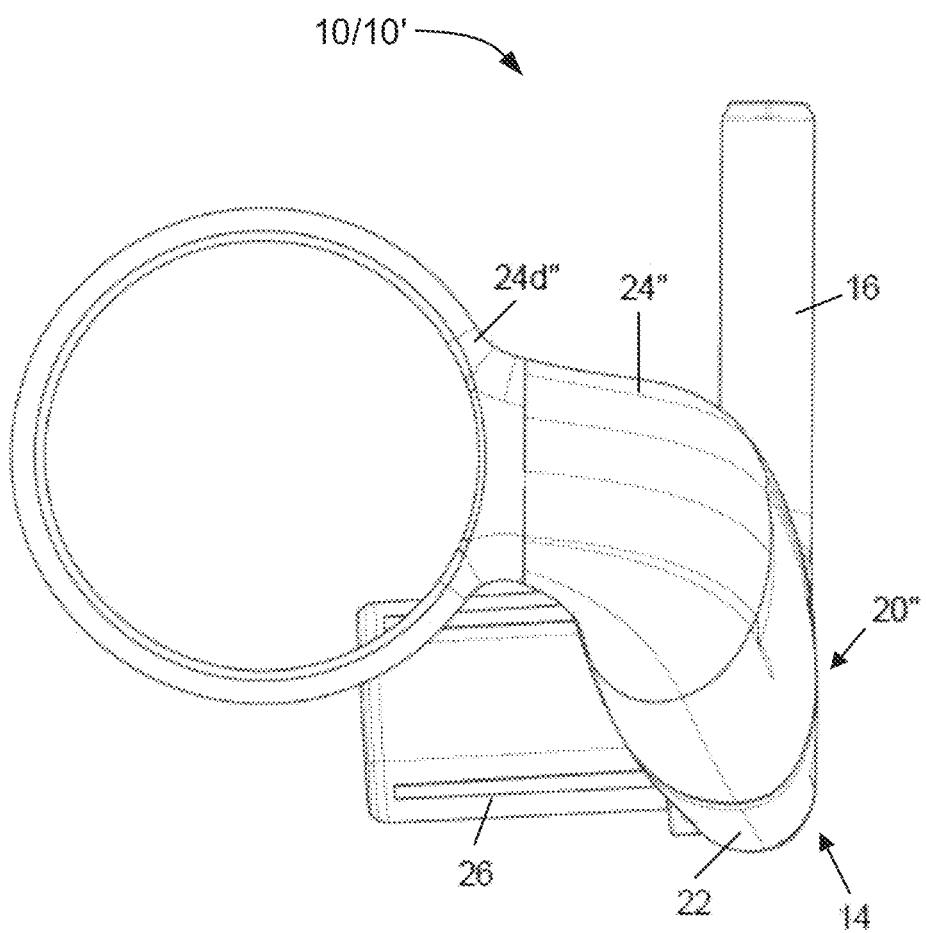
FIG. 8 shows a perspective top view of the exemplary embodiment of the gripping unit according to FIG. 5.

FIG. 8 shows a perspective top view of the exemplary embodiment of the gripping unit 20" according to FIG. 5.

Figure 9:
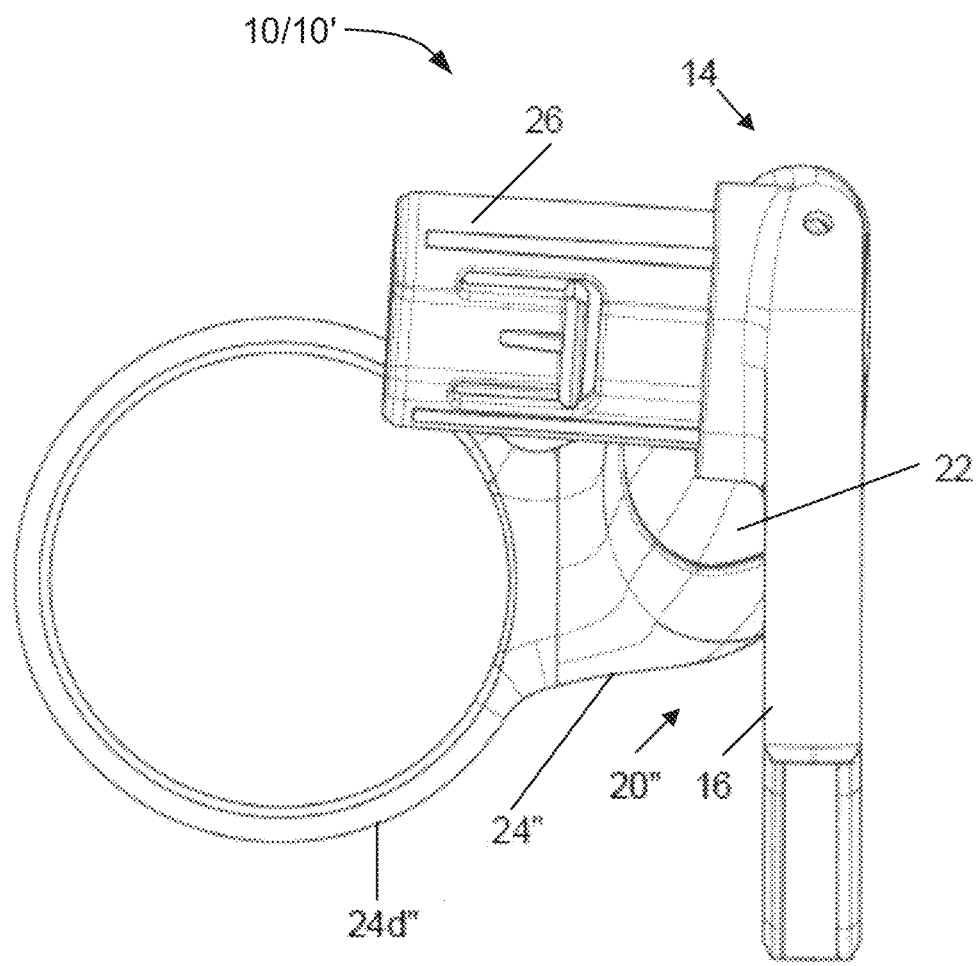
FIG. 9 shows a perspective bottom view of the exemplary embodiment of the gripping unit according to FIG. 5.

FIG. 9 furthermore shows a perspective bottom view of the exemplary embodiment of the gripping unit 20" according to FIG. 5.

The integral transition between the circular-ring-shaped structural element and the arcuate structural element is illustrated in FIGS. 8 and 9.

The integral transition is provided with a radius in order to reduce the stress concentration between the circular-ring-shaped structural element and arcuate structural element.

REFERENCE SIGNS

10 Push handle unit
12 Transverse strut
14 End piece
16 Device
18 Handle portion
20 Gripping unit
22 Gripping unit receptacle
22a Edge
24 Gripping unit insert
24a Attachment edge
24b Trough
24c Supporting surface 26 Extension
28 Recess
30 Anti-rotation means
32 Lug
34 Shopping trolley
10' Push handle unit
12' Transverse strut
13' Central piece
18' Handle portion
36' Coin deposit system
38' Display field
20" Gripping unit
24" Gripping unit insert
24d" Object holder

The invention claimed is:

1. A push handle unit comprising at least one transverse strut and comprising two end pieces which, in a mounted state, are arranged at ends of the transverse strut and have a device for fastening to a manually movable transport trolley, wherein the push handle unit has a free-standing, projecting gripping unit on each of the two end pieces, where the gripping unit in each case consists at least of a gripping unit receptacle and a gripping unit insert, wherein the gripping unit receptacle is molded onto each end piece, and wherein an object holder is molded integrally onto the gripping unit insert.

2. The push handle unit as claimed in claim 1, wherein the gripping unit insert is insertable into the gripping unit receptacle.

3. The push handle unit as claimed in claim 1, wherein the gripping unit insert is latchable in the gripping unit receptacle.

4. The push handle unit as claimed in claim 1, wherein the gripping unit insert has an attachment edge at least in sections.

5. The push handle unit as claimed in claim 1, wherein the object holder is designed as a holder for in each case at least one drinks cup and/or a hand scanner and/or a cell phone and/or a tablet and/or a magnifying glass and/or a shopping list.

6. The push handle unit as claimed in claim 1, wherein the object holder is designed as a hook and/or an encircling handle and/or a handle cap.

7. The push handle unit as claimed in claim 1, wherein the gripping unit on one end piece is formed integrally, and wherein the gripping unit on the other end piece consists of the gripping unit receptacle and the gripping unit insert, onto which the object holder is molded.

8. The push handle unit as claimed in claim 1, wherein the transverse strut has a central piece and two handle portions which are separated from each other by the central piece.

9. The push handle unit as claimed in claim 8, wherein the central piece has a coin deposit system and/or a display field.

10. The push handle unit as claimed in claim 8, wherein each handle portion is formed by a projection of the transverse strut and by a projection of an end piece.

11. The push handle unit as claimed in claim 1, wherein the handle unit receptacle and the handle unit insert at least partially engage in each other in a form-fitting manner in the mounted state.

12. The push handle unit as claimed in claim 1, wherein the end pieces are formed from plastic.

13. The push handle unit as claimed in claim 1, wherein the gripping unit receptacle is of substantially cup-like design.

14. The push handle unit as claimed in claim 1, wherein the gripping unit receptacle and the gripping unit insert are at least partially formed from different materials.

15. The push handle unit as claimed in claim 1, wherein the gripping unit is in each case inclined in the mounted state in a direction of the transverse strut.

16. The push handle unit as claimed in claim 1, wherein each end piece has an extension which is insertable into the transverse strut.

17. The push handle unit as claimed in claim 16, wherein the extension has an anti-rotation device.

18. The push handle unit as claimed in claim 1, wherein the gripping unit in the mounted state encloses an angle within a range of between approximately 55° to approximately 85° with the transverse strut.

19. A manually movable transport trolley comprising at least one push handle unit, the push handle unit comprising at least one transverse strut and comprising two end pieces which, in a mounted state, are arranged at ends of the transverse strut and have a device for fastening to the manually movable transport trolley, wherein the push handle unit has a free-standing, projecting gripping unit on each of the two end pieces, where the gripping unit in each case consists at least of a gripping unit receptacle and a gripping unit insert, wherein the gripping unit receptacle is molded onto each end piece, and wherein an object holder is molded integrally onto the gripping unit insert.

* * * * *